A

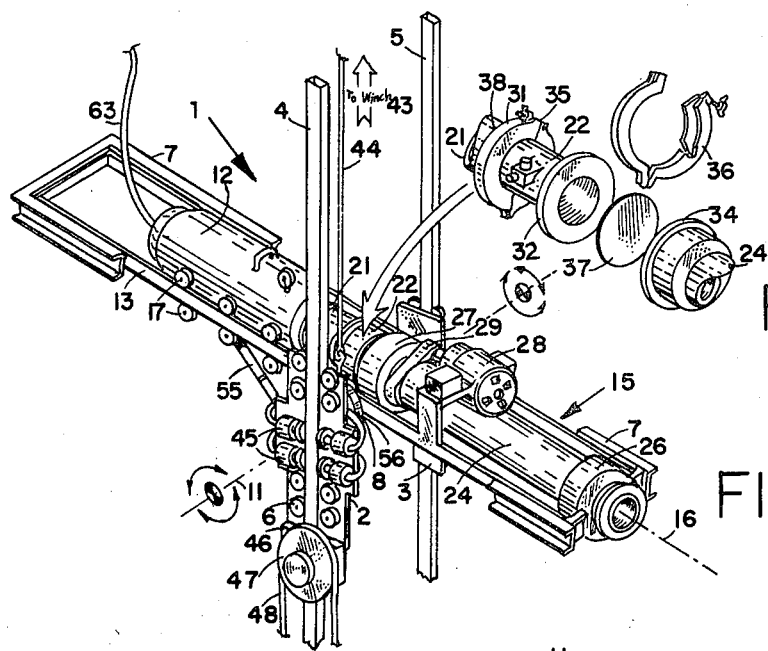
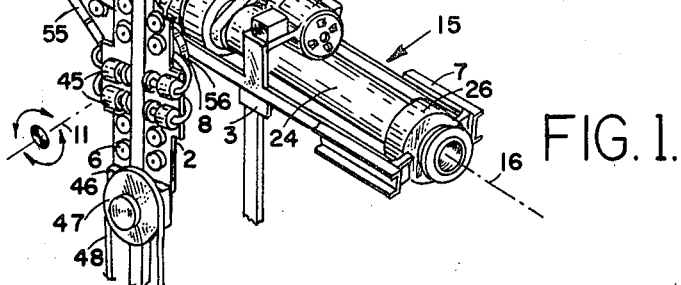
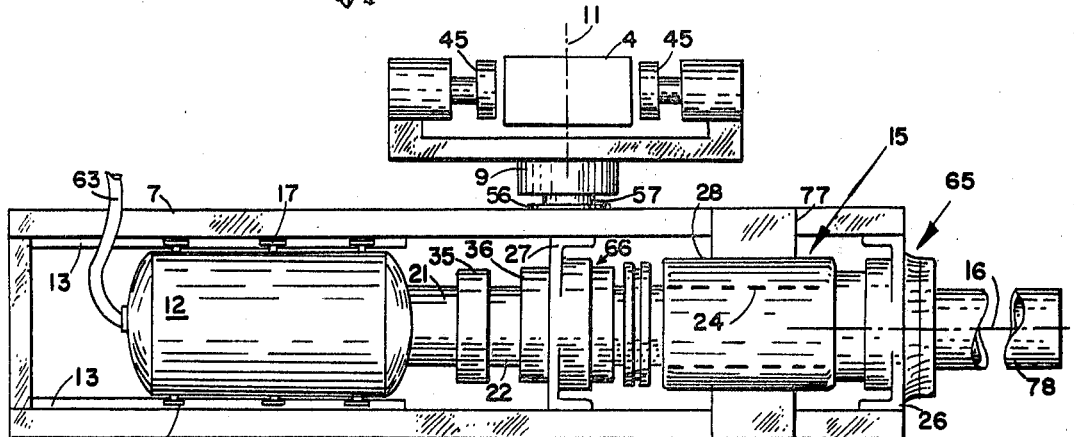
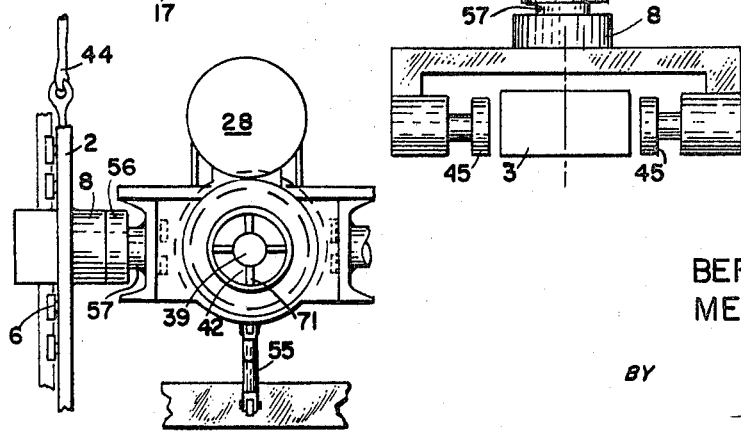
FIG. 1a.
FIG. 1.
FIG. 2.
FIG. 4.
INVENTORS
BERNARD STEIN
MELVIN S. WEINBERG
BY
ATTORNEY

B

C

INVENTORS
BERNARD STEIN
MELVIN S. WEINBERG

BY

ATTORNEY

Jan. 21, 1969  B. STEIN ET AL  3,422,808
PNEUMATIC ACCELERATING DEVICE WITH FRANGIBLE
DIAPHRAGM RELEASE MEANS
Filed April 28, 1966  Sheet 3 of 3

INVENTOR
BERNARD STEIN
MELVIN S. WEINBERG

BY

ATTORNEY

United States Patent Office 3,422,808
Patented Jan. 21, 1969

1

3,422,808
PNEUMATIC ACCELERATING DEVICE WITH
FRANGIBLE DIAPHRAGM RELEASE MEANS
Bernard Stein, Andover, Mass., and Melvin S. Weinberg,
Hudson, N.H., assignors to Sanders Associates, Inc.,
Nashua, N.H., a corporation of Delaware
Filed Apr. 28, 1966, Ser. No. 545,988
U.S. Cl. 124—11                         5 Claims
Int. Cl. F41f 1/04; F41b 11/00

ABSTRACT OF THE DISCLOSURE

A pneumatic accelerating device is provided whereby a body may be launched into space with preselected velocities of translation and rotation. A chamber, sealed at each of its ends by rupturable diaphragms, is disposed between a compressed air accumulator and a rotatable launching tube. The chamber is maintained at a pressure which is one half that of the accumulator until the apparatus is to be operated. On operation the chamber pressure is sharply reduced thus causing the sequential rupture of the two diaphragms and release of the high pressure air from the accumulator into the launching tube.

---

The invention herein described was made in the course of a contract with the Department of the Navy.

This invention relates to pneumatic accelerating devices, and more particularly to a pneumatic powered device for launching stores at predetermined velocity and rotational rates from controlled attitudes and elevations.

Heretofore, devices for launching a body into space from a stationary or a moving platform have included an explosive charge for driving a piston which, in turn, propels the body to a high speed to accomplish the launch. Such devices must be constructed to withstand considerable pressure generated by the explosion; and a supply of explosive charges must be available so that the device can be recharged each time it is fired. For a number of reasons, it is inconvenient to employ explosive charges, and it is inconvenient to operate at the high pressure typically accompanying the explosion. Accordingly, it is one object of the present invention to provide a device operating at relatively low pressure without explosive charges for launching bodies toward a target from a stationary platform or a moving vehicle.

For some applications, it is required to launch relatively heavy bodies, weighing 50 pounds and sometimes in excess thereof, at velocities up to 200 feet per second and higher, and to rotate the body at the instant of launch at speeds up to 1000 r.p.m. and higher. These requirements, combined with the necessity that the device operate at relatively low pressure without an explosive charge and without mechanical springs as the principal launching power, pose considerable problems.

It is another object of the present invention to provide a pneumatically powered launching device which meets the above requirements.

It is another object of the present invention to provide a pneumatically powered launching device which is actuated by a relatively low power signal so as to release relatively high power stored pneumatic energy which exerts an accelerating force against the body to be launched.

It is another object of the present invention to provide such a device which imparts a rotational motion to the body which is launched.

It is another object of the present invention to provide a pneumatically powered launching device which is capable of controlling the rotation, elevation and attitude of the launched device.

It is another object of the present invention to provide

2 a pneumatic control for releasing substantial power of compressed gas for performing work, the pneumatic control employing gas at a substantially lower pressure than the stored gas.

It is another object of the present invention to provide such a pneumatic control including simple parts which are easily replaced each time the high power compressed gas is released.

In accordance with the features of the present invention, a pneumatic launching device is provided for launching munitions, sonobuoys, or similar projectiles at variable velocities using relatively low pressure air at a few atmospheres and with means for imparting a rotational motion to the launched projectile, the launching being accomplished from controlled attitudes and elevations. One use of such a device is to simulate the environmental conditions encountered by a sonobuoy at entry into the water following a drop from an airplane. A sonobuoy dropped from an airplane enters the water at a speed, attitude, direction and rotation rate which are known. By using an embodiment of the present invention, these known conditions can be imposed upon a test sonobuoy launched into water under controlled conditions. Thus, the environmental conditions encountered by the sonobuoy dropped from the airplane are simulated, and this greatly facilitates improvements in sonobuoy design. The structure for launching the sonobuoy includes, principally, a pneumatic launcher positioned vertically on a carriage which rides in a track, the launcher being pivotally mounted to the carriage. Thus, the attitude and elevation of the launcher are variable.

The sonobuoy is loaded in a launching tube which connects to a relatively large compressed air accumulator or chamber. Also loaded in the tube is a drive piston, and between the piston and the accumulator is a pair of diaphragms which define a relatively small diaphragm chamber which separates the piston from the compressed air in the accumulator. In operation, after the accumulator is charged and the sonobuoy is loaded in the tube, the pressure in the diaphragm chamber is sharply reduced so that the diaphragms rupture, and the compressed air from the accumulator drives the piston and sonobuoy down the tube. At the end of the tube, a restriction slows the piston, but does not slow the sonobuoy; and so the sonobuoy is launched from the end of the tube.

In the embodiment of the present invention described herein, the tube is formed in at least two sections, such that the section in which the piston and sonobuoy are loaded is rotatable with respect to the other sections, and means are provided for rotating this section at high speed, so that a spin or rotational motion is imparted to the sonobuoy as it is launched from the tube. Thus, by controlling the pressure in the accumulator, the rotational speed of the tube and the attitude and elevation of the pneumatic launcher, all the environmental conditions encountered by a sonobuoy at water entry are simulated.

In the embodiment of the present invention described herein, the launching tube is formed by joining three different sections: a rotatable section, a diaphragm chamber section, and a section attached to the accumulator. Means are provided for quickly disconnecting these sections and moving the accumulator and the rotatable section away from each other, so that the piston and sonobuoy can be readily loaded in the rotatable section, and the diaphragms can be inserted at each end of the diaphragm chamber section. Next, the accumulator and the rotatable section are moved toward each other, and the diaphragm section is positioned therebetween. The three sections are then reconnected, and the launcher is ready to launch the sonobuoy.

Other objects and features of the present invention will be apparent from the folowing specific description, taken in conjunction with the figures, in which:

FIG. 1 is pictorial view of a pneumatic launcher, carriage and track, illustrating the various parts thereof;

FIG. 1a is an exploded view of the launching tube, showing the rotating section disconnected from the diaphragm chamber to permit replacement of the diaphragms;

FIG. 2 is a plane view of the pneumatic launcher;

FIG. 4 is a front view of the pneumatic launcher;

Figure 6:
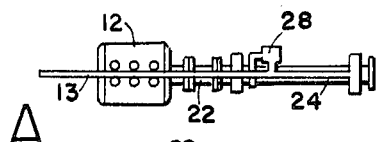
Figure 6:
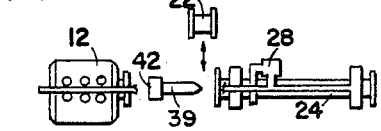
Figure 6:
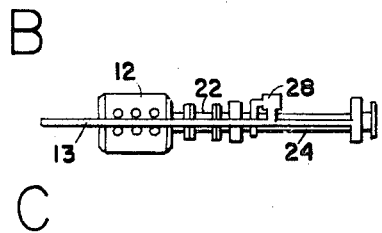
Figure 7:
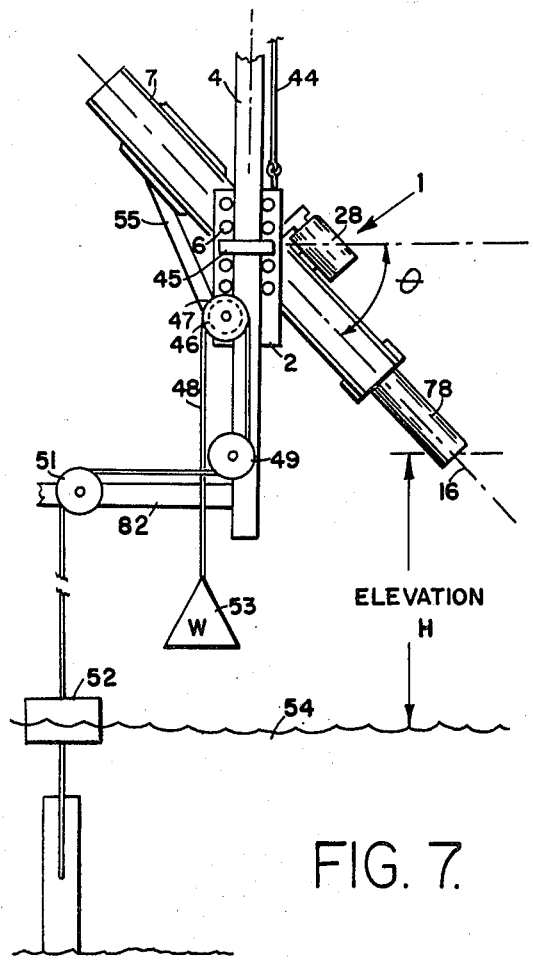
Figure 8:
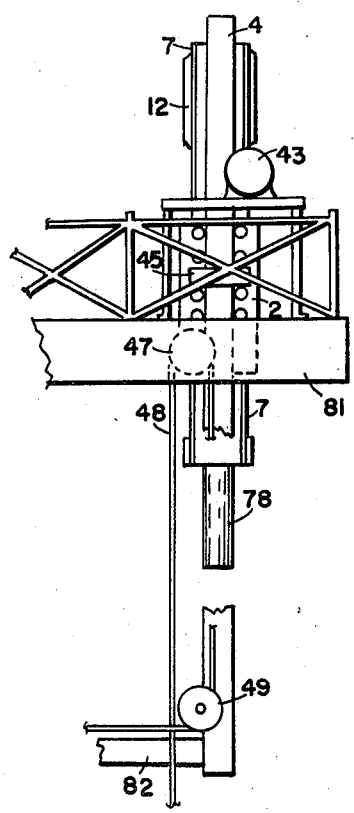

FIGS. 6A, B and C illustrate the loading sequence, whereby the sonobuoy is loaded and the diaphragms are replaced before a launch;

FIG. 7 illustrates a mechanism for monitoring the elevation and attitude of the pneumatic launcher;

FIG. 8 illustrates the launcher in a vertical position; and

Figure 9:
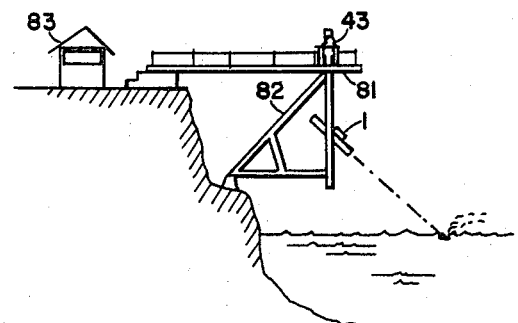

FIG. 9 is a structural layout showing support structure for the pneumatic launcher.

Turning first to FIG. 1, there is shown the pneumatic launcher 1 mounted to carriage 2, which rides on left and right vertical tracks 4 and 5, respectively. Trolley wheels, such as wheels 6 on the carriage, engage the track so that the carriage can move only along the direction of the track.

The pneumatic launcher includes an elongated rectangular frame 7 (shown partially removed) which is pivotally connected to the carriage via bearings 8 and 9 therebetween (as clearly shown in FIG. 2), so that the frame may pivot about the axis 11. Within this frame are mounted the parts of the pneumatic launcher. These include an accumulator 12 riding on a track 13 along the inside of the frame, and a launching tube assembly 15 which connects to the accumulator. The launching tube assembly is mounted to the frame so that it cannot move in translation along the axis 16 of the pneumatic launcher. However, the accumulator, by virtue of its mount via wheels 17 to the track 13, can be moved along the axis 16 of the launcher. As will be seen later, this is to facilitate loading and unloading the launcher and replacing the diaphragms therein.

The launching tube assembly 15 includes three tubular sections which are separate from each other. One of these tubular sections 21 connects directly to the accumulator. The next is the diaphragm chamber section 22 which connects to the section 21 via a quick disconnect type clamp, such as a Marmon clamp, and the third section is the rotatable section 24, which is rotatably mounted to the frame 7 via front and rear yokes 26 and 27. These yokes contain bearings which support the rotating section 24. A spin motor 28 mounted to the frame 7 drives the rotating section 24 via a timing belt 29 so that it rotates at high speed about the axis 16, imparting a spin to projectiles launched therefrom.

The diaphragm chamber section 22 includes a short section of tube with flanges 31 and 32 at each end. Flange 31 mates with flange 33 attached to the section 21, and flange 32 mates with a flange 34 attached to section 24 (see FIG. 5). The sections 21 and 22 are connected together at the flanges by a quick disconnect clamp 35, and the sections 22 and 24 are connected at their flanges via a quick disconnect clamp 36. Thus, the front and rear diaphragms 37 and 38 can be replaced by removing the clamps, sliding the accumulator 12 along the track 13, removing the diaphragm chamber section 22 and replacing the diaphragms. This sequence of operations, as well as loading, is illustrated in FIGS. 6A, 6B and 6C.

FIG. 6A shows a pneumatic launcher just after launching a projectile. FIG. 6B shows the retracted position of the accumulator and with the diaphragm chamber section 22 removed so that the diaphragms 37 and 38 may be replaced and the sonobuoy 39 and driving piston 42 loaded. FIG. 6C shows the structure ready for launching again.

As shown in FIGS. 1, 7 and 8, the pneumatic launcher 1 is positioned vertically by moving the carriage 2 along the tracks 4 and 5. This is done employing a winch 43 (see FIG. 8) which attaches to one side of the carriage via a cable 44. A brake mechanism, such as the pneumatic brake mechanism 45, carried by the carriage, locks the carriage to the tracks once the desired elevation position H is obtained (as best shown in FIG. 2). The elevation position may be monitored employing, for example, a rotation transducer 46 attached to a pulley 47 carried by the carriage 2. As shown in FIG. 7, a line 48 connects the pulley 47 via idler pulleys 49 and 51 to a float 52 and to a weight 53. The position of the float indicates the level of water 54 into which the projectile is to be launched from the pneumatic launcher. The weight 53 is sufficient to maintain the line taut so that, as the pneumatic launcher 1 rides up and down the track, the pulley 47 is rotated. A measure of the angular rotation of the pulley 47 is indicative of the elevation H of the pneumatic launcher above the level of the water. For the purpose of measuring this rotation, the elevation sensor 46 may be a rotary potentiometer or other rotation sensing device which produces an electrical signal indicating the total angular rotation of the pulley 47 from a reference position.

The attitude of the pneumatic launcher 1 is controlled by a hydraulic linear actuator 55 which connects the frame 7 to carriage 2. When this actuator is retracted, the axis 16 of the pneumatic launcher is preferably substantially horizontal; and when the actuator is extended, the axis of the launcher is preferably vertical. FIG. 1 illustrates the position of the launcher with the actuator substantially fully retracted, FIG. 7 illustrates the position of the launcher with the actuator partially extended, and FIG. 8 illustrates the position of the launcher with the actuator fully extended. As shown in FIG. 2, a transducer 56 connected to the carriage 2 tracks the rotational position of the axle 57 of the pneumatic launcher in rotation about the axis 11. This transducer produces an electrical signal representative of the attitude θ of the pneumatic launcher (as shown in FIG. 7).

Turning next to FIGS. 2 to 5, there are shown details of the pneumatic launcher and carriage. FIG. 2 is a top view showing the launcher frame 7 mounted on the axle 57. The bearings 8 and 9, which are connected to the carriage 2, have the axle 57 mounted therein. The carriage, in turn, rides along the rails 3 and 4 on the wheels 6, and the carriage is locked in position along the rails by the brake mechanism 45.

The launching mechanism includes the accumulator 12, which is charged with air via a tube 63, and the launching tube assembly 15, from which the projectile is launched. The rotating tube section 24 of the launching assembly includes front and rear bearing assemblies 65 and 66. The front bearing assembly 65 connects to the frame 7 via yoke 26, and the rear bearing assembly 66 connects to the frame 7 via yoke 27. On the other hand, the section 21 of the launching tube connects directly to the accumulator 12, and the diaphragm chamber section 22 connects directly to this via clamp 35. The other end of the diaphragm chamber section connects via clamp 36 to the yoke 27 of the bearing assembly 66. Details of the structure are shown in FIG. 5.

Figure 3:
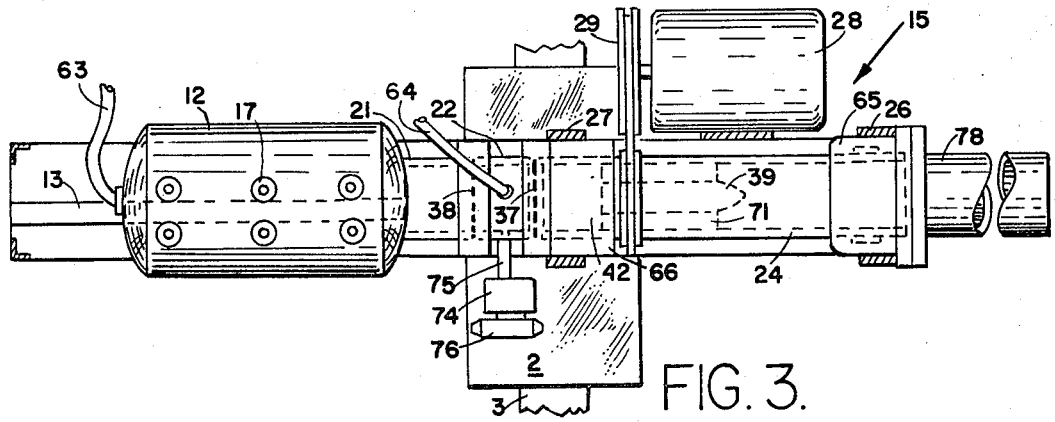
FIG. 3 is a partially sectional side view of the pneumatic launcher.
Figure 5:
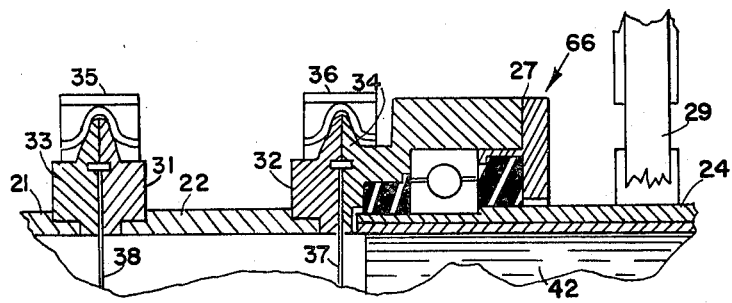
FIG. 5 is an enlarged sectional view showing the diaphragms, diaphragm chamber and the yoke, and the rotating tube section.

As shown in FIG. 5, the front and rear diaphragms 37 and 38 are carried at each end of the diaphragm chamber section 22 between the flanges. These diaphragms are preferably installed after the piston 42 and the projectile (sonobuoy) 39 are loaded in the rotating section 24 of the launch tube. The projectile 39 is preferably supported within the launch tube by runners, such as 71. The runners 71 are attached to the piston 42 and exert a minimal frictional force upon the inside walls of the tube during launch. The runners also support the projectile and position it concentrically within the launch tube. The piston, runners and projectile are spun as a single unit within the launch tube 24. The piston is connected to the launch tube by means of thin wire (not shown) which is easily broken upon launch. The wire prevents the piston, runners and projectile from shifting within said launch tube. Once the projectile is loaded and the diaphragms are inserted, and the three sections 21, 22 and 24 are connected via the clamps 35 and 36, the carriage 2 is positioned along the rails and locked at the desired position. Then, the hydraulic actuator 55 is extended as necessary to rotate the launcher 1 about the axis 11 to the desired attitude angle θ, and the mechanism is ready for charging and launch. Charging is accomplished by first pressurizing the diaphragm chamber with air through tube 64 to a pressure about one half the pressure that the accumulator 12 will be charged to. This pressure in the chamber is insufficient to rupture the diaphragms 37 and 38, both of which are designed to rupture at substantially the same pressure differential. Next, the accumulator is charged to about twice the pressure in the diaphragm chamber. This merely reverses the direction of the differential across diaphragm 38 and does not change the differential across diaphragm 37. Thus, of the total pressure differential between the pressure in the accumulator 12 and the ambient pressure in the launch tube 24, one half of this differential is taken across each of the diaphragms 37 and 38, and both diaphragms are designed to sustain one half of this differential.

The diaphragms 37 and 38 are preferably designed to burst at a pressure differential slightly greater than the differential between the charged pressure of the diaphragm chamber and the pressure of the accumulator 12. The diaphragms may be made of copper foil, aluminum foil, Kel-F or Teflon, as well as other suitable materials.

The device is fired by changing the pressure in the diaphragm chamber to ambient pressure. This is accomplished by actuating a solenoid valve 74 which connects to the diaphragm chamber via a tube 75 and discharges the pressure therein to atmosphere via a discharge port 76. When the diaphragm chamber is discharged to ambient pressure, the total differential between the accumulator pressure and ambient pressure is taken across diaphragm 38, which immediately ruptures, flooding the diaphragm chamber with compressed air at the accumulator pressure. This loads diaphragm 37 with the full pressure differential, and it also ruptures, delivering the compressed air against the piston 42. Then the piston 42 is driven through the launch tube assembly so that the sonobuoy projectile 39 is launched into space. Meanwhile, the spin motor 28 mounted on a plate 77 to the frame 7 drives the rotatable tube section 24 in rotation on its bearings, and thus imparts a rotating motion to the launched projectile.

An extension tube 78, preferably connected to the yoke 26 so that it does not rotate with the rotating section 24, is used to obtain greater expansion of the air in the accumulator, thus resulting in greater efficiency. The extension tube includes an arresting device (not shown) for slowing the piston and the runners 71. The arresting device may be spring loaded fingers within the tube section 78 or a suitable flexible material lining the inside of the tube 78. The sonobuoy, when launched, completely separates from the piston and the runners after they travel through the fixed section 78. After launching, the piston and runners may be recovered and reloaded with another sonobuoy projectile into the rotating section 24.

Typical firing positions of the pneumatic launcher are shown in FIGS. 7 and 8. A structure for supporting the tracks 4 and 5 on which the pneumatic launcher 1 is mounted is shown in FIG. 9. This structure includes a loading platform and catwalk 81 which provide access to the pneumatic launcher. Also shown are the support structure 82 and a control panel 83 from which controls for operating the winch 43, which positions the launcher in elevation, and the pneumatic actuator 55, which positions the pneumatic launcher in attitude, are operated. In addition, the accumulator pressure, spin motor 28 and the solenoid valve 75 are controlled from the panel. The panel also includes means for indicating elevation, attitude, r.p.m. and launch velocity of the projectile. Thus, the launcher may be positioned, charged and fired remotely at the control panel to launch a sonobuoy and simulate the environmental conditions at entry of the sonobuoy into the water.

This completes description of specific embodiments of the present invention, including a pneumatic system for launching a body into space, including a supply of pressurized gas and a launching tube with simple and inexpensive means for admitting the gas to the tube, so that a projectile in the tube is expelled therefrom by the gas pressure, and with means for imparting rotational motion as well as translational motion to the projectile in the process of launching. The specific embodiments described herein are made by way of example, and are not intended to limit the spirit and scope of the invention as set forth in the accompanying claims.

What is claimed is:
1. A pneumatic acceleration device comprising:
 a container for gas,
 means for charging said container with gas at a predetermined pressure,
 a launching tube into which a projectile to be launched may be loaded,
 a gas conduit connecting said launching tube and said container,
 a gas tight chamber disposed in said conduit and terminated at each of its ends by first and second diaphragms mounted in said conduit,
  a first of said diaphragms being in gas communication with said container, and
  a second of said diaphragms being in gas communication with said launching tube, and
 means for selectively providing a pressure differential between said chamber and said container such that said first and second diaphragms are sequentially ruptured thereby delivering said gas to said launching tube.

2. Apparatus as recited in claim 1 wherein:
said launching tube is rotatably connected to said gas conduit and means are provided for driving said launching tube in rotation,
thereby to impart a rotational motion to said projectile launched therefrom.

3. Apparatus as recited in claim 1 wherein:
said diaphragms are constructed to rupture at a pressure differential less than the pressure differential between the pressure of the gas in said container and the pressure in said launching tube.

4. Apparatus as recited in claim 1 wherein said means for selectively providing a pressure differential between said chamber and said container comprises:
 means for pressurizing said chamber to a pressure which is substantially one-half the pressure of said gas in said container, and
 means for reducing the pressure in said chamber such that it is substantially equal to the pressure in said launching tube.

5. Apparatus as recited in claim 1 further including:
 a frame,
 a carriage for supporting said frame,
 means for mounting said container, said chamber and said launching tube in coaxial alignment in said frame such that said container and said chamber may be moved apart from said launching tube and each other along said axis,
 whereby the ends of said chamber may be exposed to permit replacement of said diaphragms, and removable means for providing a gas tight connection between said container and one end of said chamber and said launching tube and the other end of said chamber.

References Cited

UNITED STATES PATENTS

| | | | |
|---|---|---|---|
| 422,347 | 2/1890 | Hyde | 124—11 |
| 556,058 | 3/1896 | Huey | 124—11 |
| 2,304,841 | 12/1942 | Mikkelsen | 124—11 |
| 2,923,286 | 2/1960 | Draganti. | |
| 3,084,598 | 4/1963 | Coslowsky | 89—1.808 |
| 3,088,225 | 5/1963 | Amistadi | 124—1.808 |
| 3,315,564 | 4/1967 | Hazlett | 124—1.808 |

ANTON O. OECHSLE, *Primary Examiner.*

RICHARD W. DIAZ, JR., *Assistant Examiner.*

U.S. Cl. X.R.

124—31